United States Patent
Theuerkorn et al.

(10) Patent No.: US 6,672,774 B2
(45) Date of Patent: Jan. 6, 2004

(54) POST-CONNECTORIZATION BOOT, CONNECTORIZED FIBER OPTIC CABLE ASSEMBLY INCLUDING SAME, AND RELATED METHODS

(75) Inventors: Thomas Theuerkorn, Hickory, NC (US); Stephan Toepper, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 38 days.

(21) Appl. No.: 09/972,103

(22) Filed: Oct. 5, 2001

(65) Prior Publication Data

US 2003/0068139 A1 Apr. 10, 2003

(51) Int. Cl.[7] ................................................ G02B 6/36
(52) U.S. Cl. ........................................................ 385/86
(58) Field of Search ............................. 385/86, 77, 78, 385/87

(56) References Cited

U.S. PATENT DOCUMENTS

| | | | |
|---|---|---|---|
| 4,611,875 A | 9/1986 | Clarke et al. | 339/154 A |
| 5,037,175 A | 8/1991 | Weber | 385/76 |
| 5,224,186 A | 6/1993 | Kishimoto et al. | 385/78 |
| 5,347,603 A | 9/1994 | Belenkiy et al. | 385/86 |
| 5,461,690 A * | 10/1995 | Lampert | 385/100 |
| 5,481,634 A | 1/1996 | Anderson et al. | 385/76 |
| 5,638,474 A | 6/1997 | Lampert et al. | 385/78 |
| 5,640,476 A | 6/1997 | Womack et al. | 385/86 |
| 5,710,851 A | 1/1998 | Walter et al. | 385/86 |
| 6,134,370 A | 10/2000 | Childers et al. | 385/135 |
| 6,482,017 B1 * | 11/2002 | Van Doorn | 439/89 |
| 2002/0150352 A1 * | 10/2002 | Ngo | 385/86 |

* cited by examiner

*Primary Examiner*—Michael C. Zarroli

(57) ABSTRACT

A strain relief boot that attaches to and can be removed from a pre-assembled fiber optic cable and connector, as well as, related strain relief boot designs and methods of assembly are disclosed. The strain relief boot may be overmolded, formed of a unitary unit, include two components, or even a coil element. The strain relief boot may be used during original assembly or as a replacement part. A variety of strain relief boot design alternatives and fiber optic assemblies that include the strain relief boot are disclosed.

46 Claims, 9 Drawing Sheets

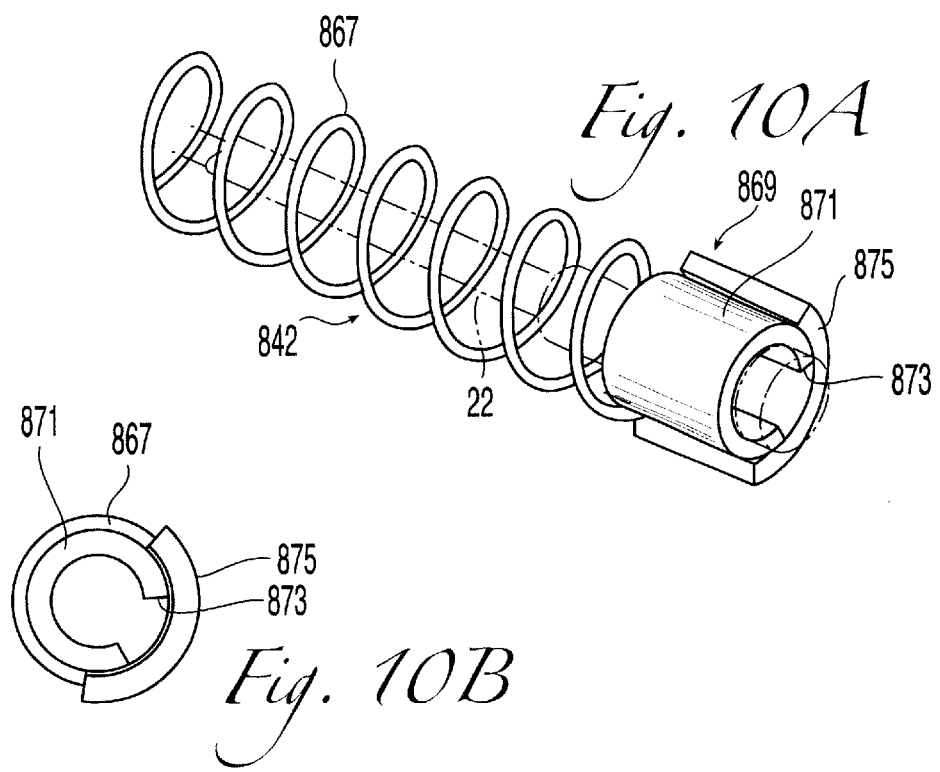
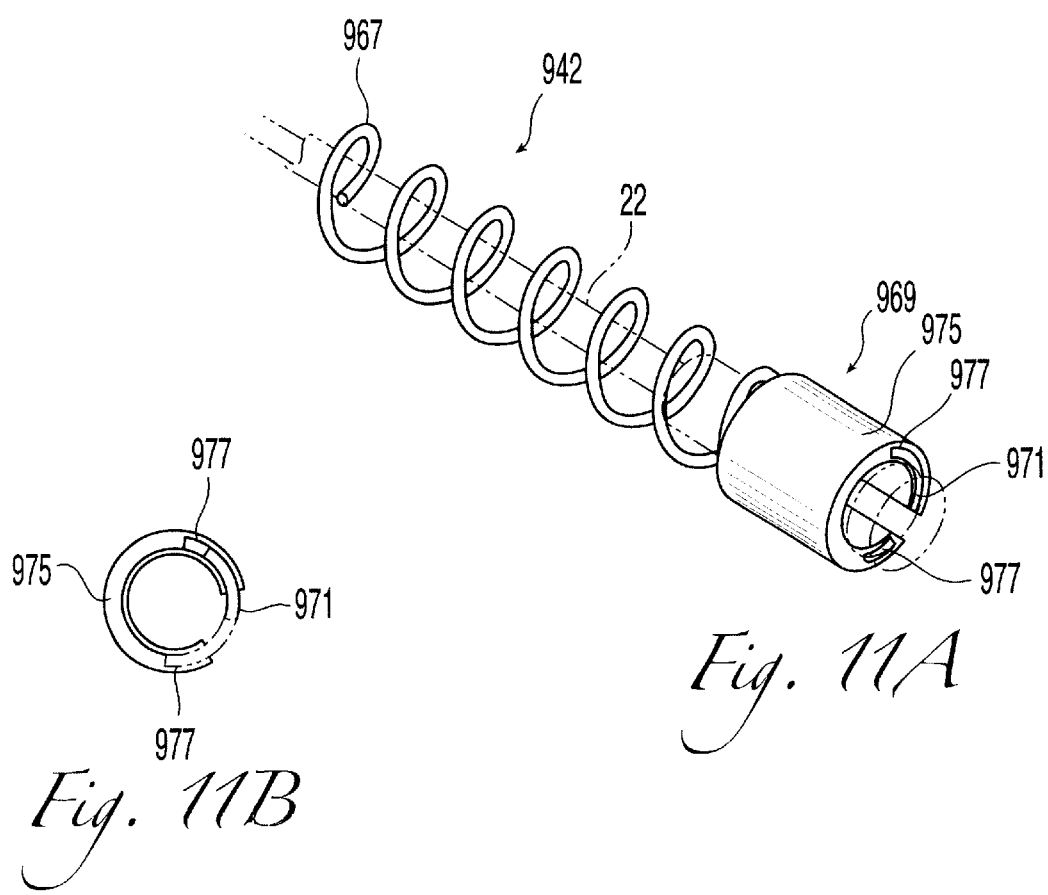

POST-CONNECTORIZATION BOOT, CONNECTORIZED FIBER OPTIC CABLE ASSEMBLY INCLUDING SAME, AND RELATED METHODS

FIELD OF THE INVENTION

The invention relates generally to fiber optic cable connectors, strain relief of boots for such connectors, and methods of assembling such connectors. More particularly, the invention is directed to a fiber optic cable connector having a strain relief boot that can be easily attached to and removed from an assembled fiber optic assembly, as well as, related strain relief boot designs and methods of assembly.

BACKGROUND OF THE INVENTION

Various types of connectors have been developed for connecting optical cables to optical system components such as active or passive optical devices, or to other optical cables. Numerous factors influence the design of such connectors, including the diameter and makeup of the optical fiber used in the cable, the environment into which the cable and connector are placed, the space available for connection, and the number of connections required in a given location, to name but a few. Several of the optical cable connectors currently in common use include SC, DC, Unicam, LC, FC, ST, MTP, MU, MTRJ, and similar connectors.

Many such connectors are attached to a flexible member, commonly known as a strain relief boot, on the end of the connector opposite the terminated fiber. As the name suggests, the strain relief boot reduces strain on the fiber optic cable and connector, such as, for example, during pulling on the cable, so as to avoid violating the minimum bend radius of the optical fiber within the cable. Such bending could lead to attenuation and even breakage of the optical fiber or other damage to the connector.

Boots typically are annular with one wider end and one narrower end. The fiber optic cable passes through the boot with the wider end typically attaching to the connector and with the cable exiting the narrower end. In connectorizing a fiber optic cable, the first step is typically sliding a boot over the cable from the end being connectorized. Afterwards, various other parts such as a crimp band, a crimp body, a ferrule, a ferrule holder, a connector housing, etc., are attached to the end in sequence while various manipulations are performed to the cable and the parts. Once most if not all of the connector assembly steps are completed, the boot is slid along the fiber optic cable until the boot engages and is secured to the connector.

While connectorizing a fiber optic cable is typically not a complicated or time consuming task for a trained technician, a certain amount of time is required to properly achieve such connectorization. If one forgets to attach the boot before some of the connectorization steps are performed, the fiber optic cable will have to be cut and all of the steps will have to be performed again, thereby causing delay and a waste of otherwise acceptably assembled parts. Further, if a boot were to become damaged, one would have to recut and reconnectorize the cable in order to replace just the boot. Also, if one were to wish to change the type of boot on the connector, one would also have to recut the cable and reconnectorize it. As compared to many of the connector parts, the boot is not subject to high manufacturing tolerances and precise assembly requirements. Thus, to replace a "low tolerance" part of a connector assembly, more precisely manufactured and assembled parts must be discarded and replaced. As can be seen, in each of these scenarios, potentially acceptable connector parts are discarded, and additional effort and expense is required to reconnectorize the cable in order to add or change the boot.

SUMMARY OF THE INVENTION

This invention addresses the above needs by providing a strain relief boot for that is configured to be easily installed after a connector and an fiber optic cable, ribbon, or other device have been assembled in a fiber optic assembly. Further, the strain relief boot of this invention provides means for repeatedly removing and reinstalling the strain relief boot to the fiber optic assembly without damage to the connector or to the fiber optic cable, ribbon, or other device of the fiber optic assembly. While the embodiments below describe the fiber optic assembly having a connector and a fiber optic cable, this is not to be limiting and should be understood that alternate embodiments of the fiber optic assembly may have a connector and a fiber optic ribbon or an optical device.

The strain relief boot includes an extending member having a first end configured for attachment to the connector, a second end opposite the first end, and a passageway extending from the first end to the second end configured to receive a portion of the fiber optic cable and a portion of the connector. The extending member is flexible so as to be bendably deflectable along with the portion of the fiber optic cable relative to the connector. Further, the extending member includes attachment means for attaching the extending member to the connector and to the portion of the fiber optic cable after the connector and the fiber optic cable are positioned together. In alternate embodiments, the extending member is rigid so as to not bend.

The attachment means may include an overmolded extending member configuration, or a slit extending from the first end to the second end in communication with the passageway, the slit configured for passing at least the fiber optic cable into the passageway in a radial direction. The attachment means may alternatively include two parts configured to be attached together to form the passageway therebetween, at least one hinge formed unitarily with and between the two parts, an adhesive, a hot melt, an ultrasonic weld, and/or mating elements disposed on the extending member. The attachment means may also include a coil element extending member configuration and a collar disposed at an end of the coil element.

Also, the extending member may include two parts configured to be attached together to form the passageway therebetween. The extending member may include at least one hinge formed unitarily with and between the two parts, or the two parts may be formed nonunitarily. The two parts may attached together at least partially by an adhesive, by a hot melt, by an ultrasonic weld, by mating elements disposed on each of the two parts, by an interference fit, by a snap fit, or by other suitable techniques.

The extending member may include a coil element, and the coil element may have two ends. The extending member may include a collar disposed at one of the ends. The collar may include a first part and a second part, the second part being movable relative to the first part to open or close a slit extending axially along the collar.

The collar may be configured to be attachable to or removable from the fiber optic cable and the connector when the slit is opened, and the collar may be configured to secure the extending member to the fiber optic cable and the connector when the slit is closed.

The extending member may be at least partially curved along its length, and the extending member may be configured so that a curvature of the extending member has a radius of curvature greater than a minimum bend radius of the fiber optic cable. The extending member may curved from about 179 degrees to about 90 degrees. Alternatively the extending member may be substantially straight or about 180 degrees.

The extending member may include a tapered portion having an outer diameter that decreases in the direction of the second end of the extending member. The extending member tapered portion may taper uniformly or nonuniformly. The extending member may define openings extending substantially radially, and the extending member may be configured to be rotatable relative to the connector.

According to another aspect of the invention, a method of assembling a connectorized end of a fiber optic cable is provided, the method including the steps of preparing the end of a fiber optic cable for connectorizing, connectorizing the fiber optic cable by attaching a connector to the end of the fiber optic cable, and attaching a flexible strain relief boot to the connector and a portion of the fiber optic cable after the connectorizing step.

The attaching step may include overmolding the strain relief boot. Alternatively, the attaching step may include sliding at least the fiber optic cable through an opening in the strain relief boot into a passageway extending through the strain relief boot. The attaching step may also include attaching two parts of the strain relief boot together to enclose at least a portion of the fiber optic cable within a passageway extending through the strain relief boot. This may be accomplished by attaching the two parts using an interference fit, a snap fit, an adhesive, a hot melt, an ultrasonic weld, and/or mating elements disposed on the two parts. Further, the two parts may be formed unitarily with a hinge, and attaching the two parts may include pivoting the two parts at the hinge so as to provide contact between the two parts.

The attaching step may also include threading a coil around the fiber optic cable, opening a collar attached to the coil, threading the fiber optic cable through the opened collar, and closing the collar after the fiber optic cable has been threaded through the collar.

The attaching step may also include the substeps of placing the strain relief boot around the fiber optic cable spaced from the connector, and sliding the strain relief boot along the fiber optic cable into engagement with the connector. Alternately, the attaching step may include placing the strain relief boot simultaneously around the connector and the fiber optic cable.

It is to be understood that both the foregoing general description and the following detailed description are exemplary and explanatory only, and are not restrictive of the invention as claimed.

For better understanding of this invention, reference is made to the following description taken in conjunction with the accompanying drawings.

BRIEF DESCRIPTION OF THE DRAWINGS

The above and other aspects and advantages of this invention are apparent from the detailed description below in combination with the drawings, in which:

FIG. 6b is an end view of the embodiment of FIG. 6a.

FIG. 7b is an end view of the embodiment of FIG. 7a.

FIG. 8b is an end view of the embodiment of FIG. 8a.

FIG. 9b is an end view of the embodiment of FIG. 9a.

FIG. 10a is another embodiment of a strain relief boot according to this invention including a coil element and a collar.

FIG. 10b is an end view of the embodiment of FIG. 10a.

FIG. 11a is a perspective view of another embodiment of a strain relief boot including a coil element and a collar.

FIG. 11b is an end view of the embodiment of FIG. 11a.

DETAILED DESCRIPTION

Figure 1:
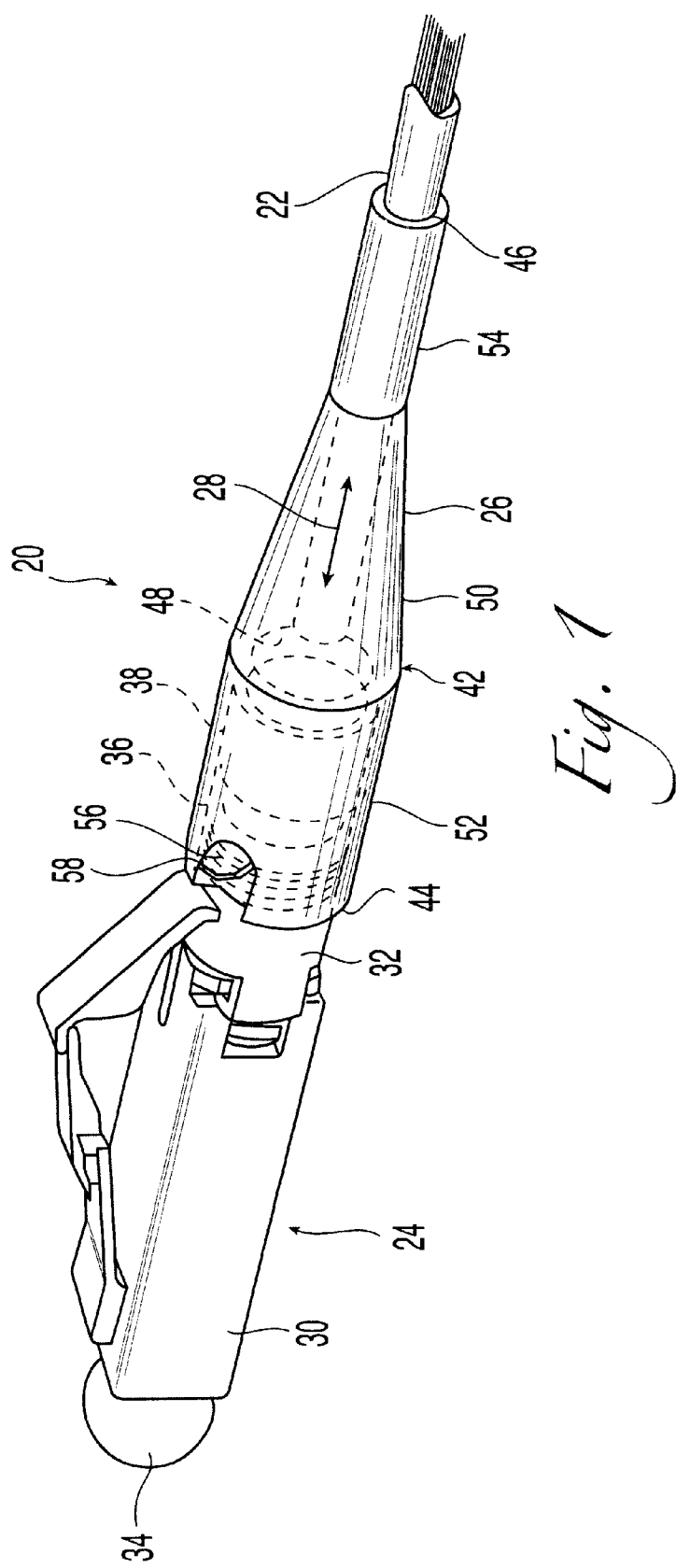
FIG. 1 is a partially broken away perspective view of a connectorized fiber optic cable with a strain relief boot formed by an overmolding process, according to one embodiment of the invention.

Detailed reference will now be made to the drawings in which examples embodying this invention are shown. The drawings and detailed description provide a full and detailed written description of the invention and of the manner and process of using it so as to enable one skilled in the pertinent art to make and use it as well the best mode of carrying out this invention. However, the examples set forth in the drawings and detailed description are provided by way of explanation of the invention and are not meant as a limitation of this invention. This invention thus includes any modifications and variations of the following examples as come within the scope of the appended claims and their equivalents.

The detailed description uses numerical and lettered designations to refer to figures in the drawings. Like or similar designations in the drawings and description have been used to refer to like or similar parts of this invention, in particular with reference to corresponding parts in different embodiments.

FIG. 1 shows an embodiment of a connectorized fiber optic assembly 20 including a fiber optic cable 22, a connector 24, and a strain relief boot 26. It should be understood that connector 24 may comprise any type of connector suitable for use with fiber optic cables, fiber optic ribbons, and optical devices. Thus, the specific connector type an the fiber optic cable shown should thus not be considered limiting of the invention in any way. A connector like that shown in FIG. 1 is discussed in more detail in U.S. patent application Ser. No. 09/737,040, filed Dec. 14, 2000, the entire disclosure of which is incorporated by reference into this application.

Figure 2:
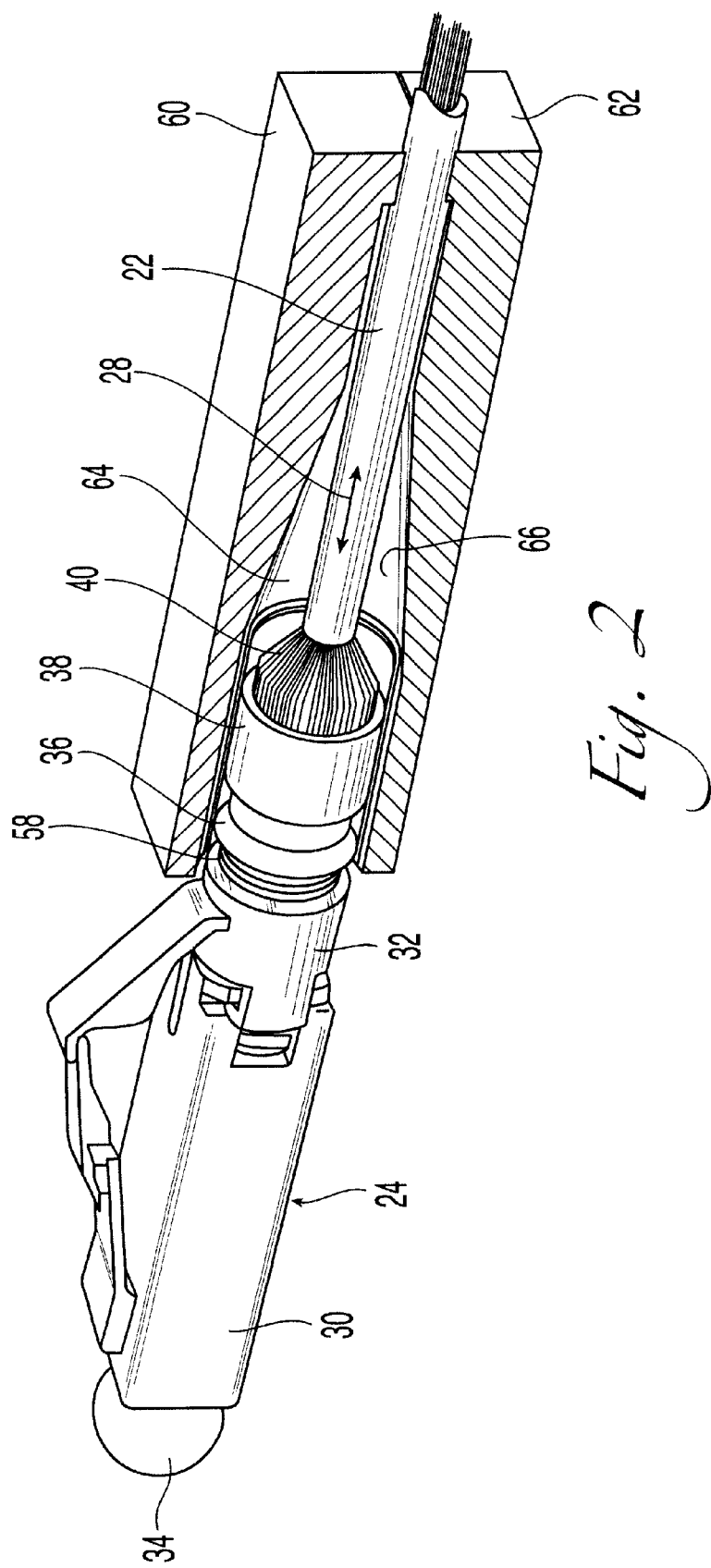
FIG. 2 is a perspective view in partial section showing one example of molds suitable for overmolding the strain relief boot (not present in FIG. 2) onto the connectorized fiber optic cable of FIG. 1.

As generally shown in FIGS. 1 and 2, connector 24 is attached to an end 28 of fiber optic cable 22 (the end face of cable 22 is located within connector 24, and is thus not visible in FIG. 1). Connector 24, as shown in FIG. 1, includes a housing 30, a trigger member 32, a dust cap 34, a crimp body 36, a crimp ring 38, and a tube portion 40 of a ferrule assembly (not otherwise shown).

Strain relief boot 26 includes an extending member 42 having a first end 44 configured for attachment to connector 24, a second end 46 opposite the first end, and a passageway 48 extending from the first end to the second end. The passageway 48 is configured to receive a portion of fiber optic cable 22 and a portion of connector 24. In the connector shown in FIG. 1, strain relief boot 26 is disposed around crimp body 36 and crimp ring 38 and encloses portions of cable 22 inside and adjacent to connector 24.

Optionally, extending member 42 of boot 26 may include a tapered portion 50 having an outer diameter that decreases in the direction of second end 46 of extending member 42. As illustrated in FIG. 1, tapered portion 50 is located between a first portion 52 of greater diameter and a second portion of 54 of lesser diameter.

Boot 26 and/or connector 24 may include mating structure to retain boot 26 on connector 24. For example, as shown in the broken away part of FIG. 1, boot 26 may have a ridge 56 that seats in a groove 58 of crimp body 36 (or some other portion of connector 24) to maintain boot 26 in position on connector 24. Multiple mating ridges and grooves may be provided, or the position of the ridge and groove could be reversed, or other such retaining structure could be utilized, within the scope of the invention.

Extending member 42 is flexible as to be bendably deflectable along with the portion of fiber optic cable 22 disposed within passageway 48 relative to connector 24. Thus, extending member 42 may be made of a flexible material such as thermoplastic. Alternately other materials, flexible as well as rigid, may be used, including polypropylene, polycarbonate, stainless steel, and aluminum. In alternate embodiments, the extending member is rigid so as to not bend along the portion of the fiber optic cable disposed within the passageway relative to the connector.

Extending member 42 is configured to be attachable to connector 24 and the portion of cable 22 that will be disposed within the extending member after the connector and the cable are secured together. Thus, extending member 42 is connected to connector 24 and cable 22 radially or circumferentially. Extending member 42 is not therefore fit over cable 22 prior to its attachment to connector 24 and then simply slid along cable 22 until the extending member engages connector 24.

According to one embodiment of the invention, extending member 42 is overmolded onto the connectorized connector 24 and cable 22. FIG. 2 shows a sectional view of a mold having two halves 60 and 62 suitable for forming extending member 42 over the connectorized fiber optic assembly 20. The mold halves 60, 62 have mating interior surfaces 64,66 that define the outer shape of extending member 42. If extending member 42 is overmolded, various methods and formulations may be used.

Figure 3:
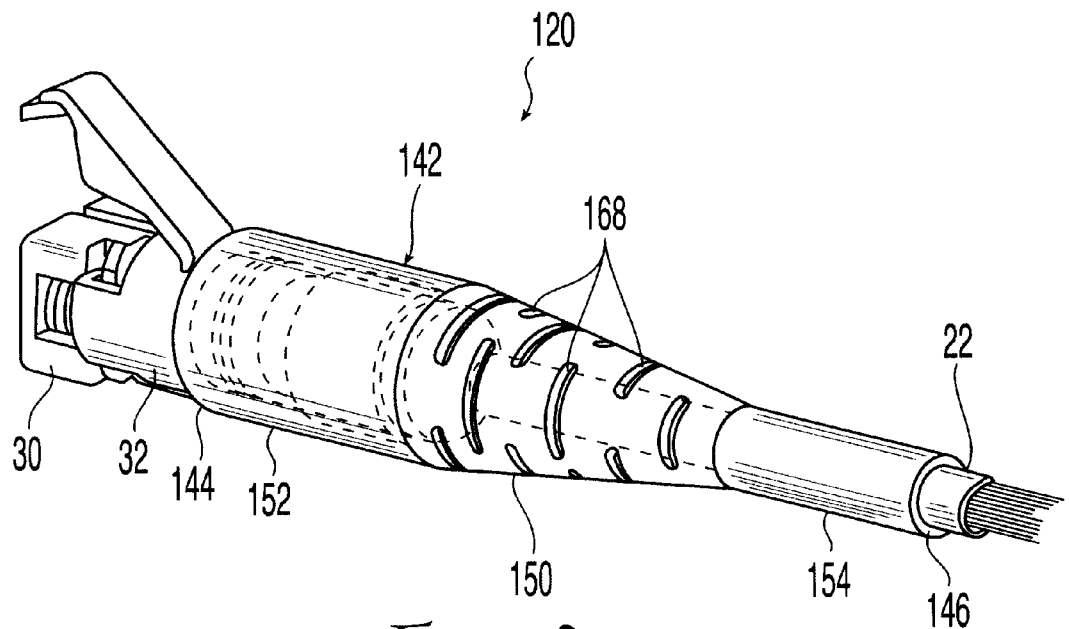
FIG. 3 is a perspective view of another embodiment of a connectorized cable and strain relief boot assembly wherein the boot has radial slots.

An alternate embodiment of an extending member suitable for use with a cable and connector is shown in FIG. 3. Extending member 142 is shaped roughly similar to extending member 42. For example, extending member 142 includes a first end 144, a second end 146, a passageway 142 therebetween, a tapered portion 150, a wide portion 152, and a narrow portion 154. Tapered portion 150 tapers uniformly between portion 152 and portion 154, as described in the embodiment of FIGS. 1 and 2. However, if desired, the tapered portion could have a different (curved or otherwise) unusual tapered cross section, if desired. Extending member 142 defines openings 168 extending substantially radially. As shown in FIG. 3, openings 168 take the form of slots. These openings provide additional flexibility for tapered portion 150 to allow smoother bending of extending member 142 at that area.

Figure 4:
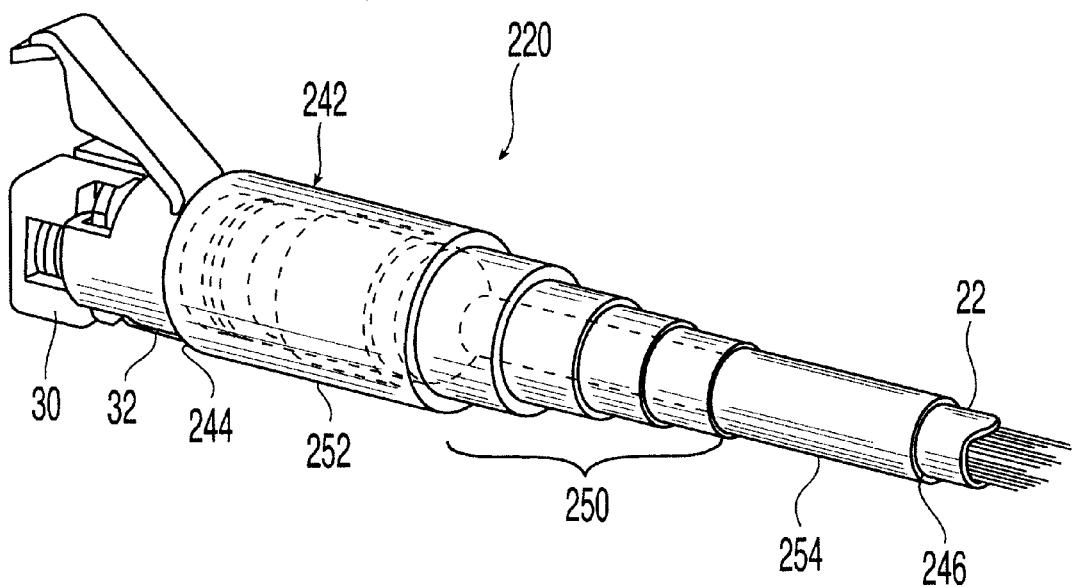
FIG. 4 is perspective view of another embodiment of a connectorized cable and strain relief boot assembly wherein the boot has a stepped tapered section.

FIG. 4 shows another embodiment of an extending member, wherein extending member 242 includes a tapered portion 250 that tapers nonuniformly (step wise) between wide portion 252 and narrow portion 254 at first end 244 and second end 246.

Figure 5:
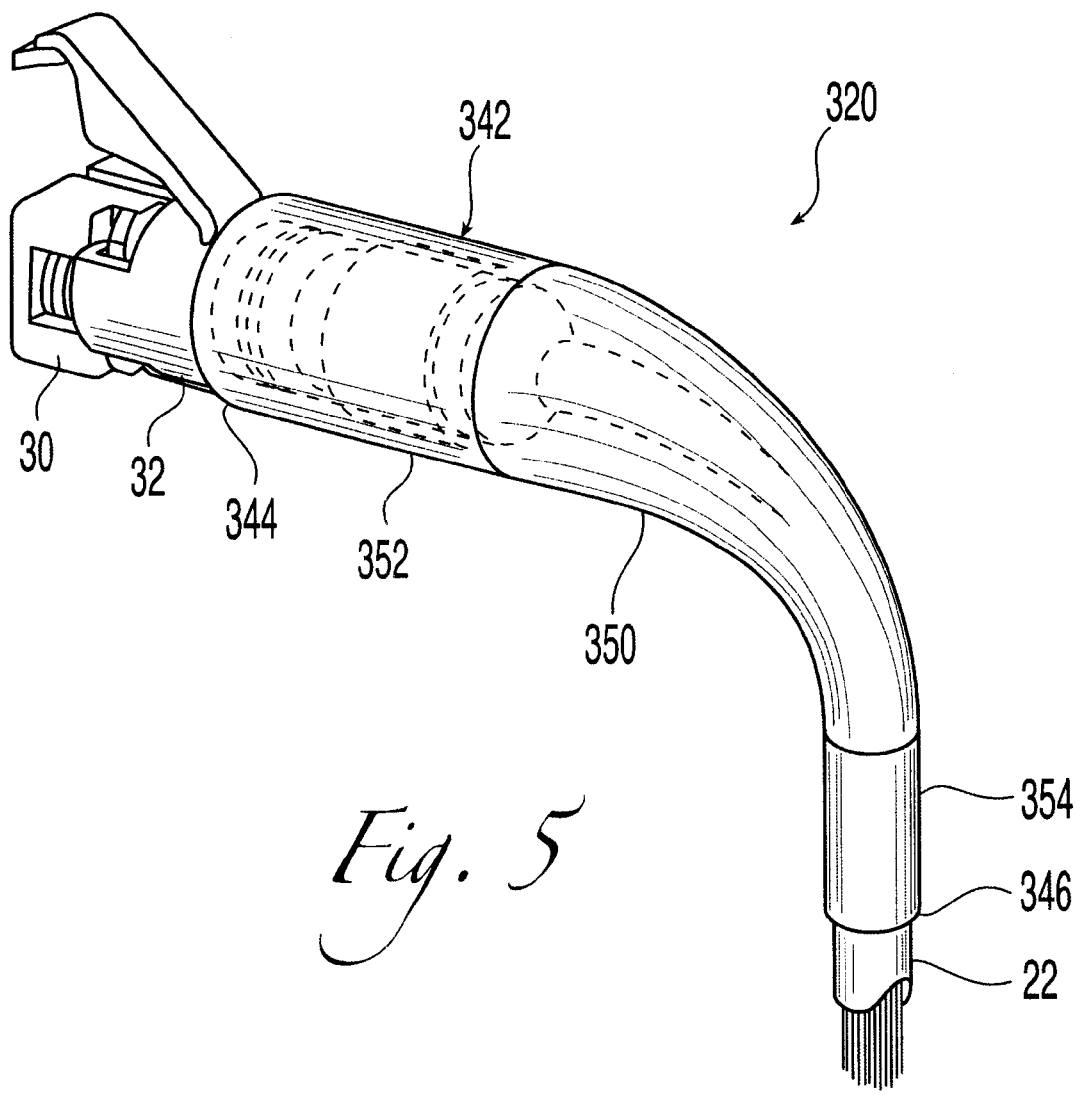
FIG. 5 is perspective view of another embodiment of a connectorized cable and strain relief boot assembly wherein the boot is at least partially curved.

FIG. 5 shows another embodiment of an extending member, wherein extending member 342 is at least partially curved along its length. As shown, tapered portion 350 is curved between wide portion 352 at first end 344 and a narrow portion 354 at second end 346. Although the previous embodiments of the extending members may be curved by virtue of force applied to the respective cables, in some applications such a pre-curved extending member 342 may be desired.

Extending member 342 may be configured, for example, so that a curvature of the extending member has a radius of curvature greater than a minimum bend radius of cable 22. It may also be desirable to have extending member 342 curve from about 179 degrees through about 90 degrees for some plug-in applications.

The overmolded extending members can be made so as to be rotatable relative to cable 22 and connector 24. Thus, connector 24 may be made circumferentially symmetrical or cylindrical so as to improve rotatably, either continuously, or to a number stop positions.

For each of the above embodiments, it should be understood that the respective extending members may all be overmolded using mold halves as described above, or using some other commonly molding process. The interior surfaces of the mold halves could readily be altered to create the disclosed extending member shapes or other shapes within the scope of the invention. Also certain features of the disclosed embodiments could readily be combined with each other (for example, the openings 168 shown in FIG. 3 may be combined with the curvature in the tapered portion 350 of the embodiment shown in FIG. 5).

Figure 6A:
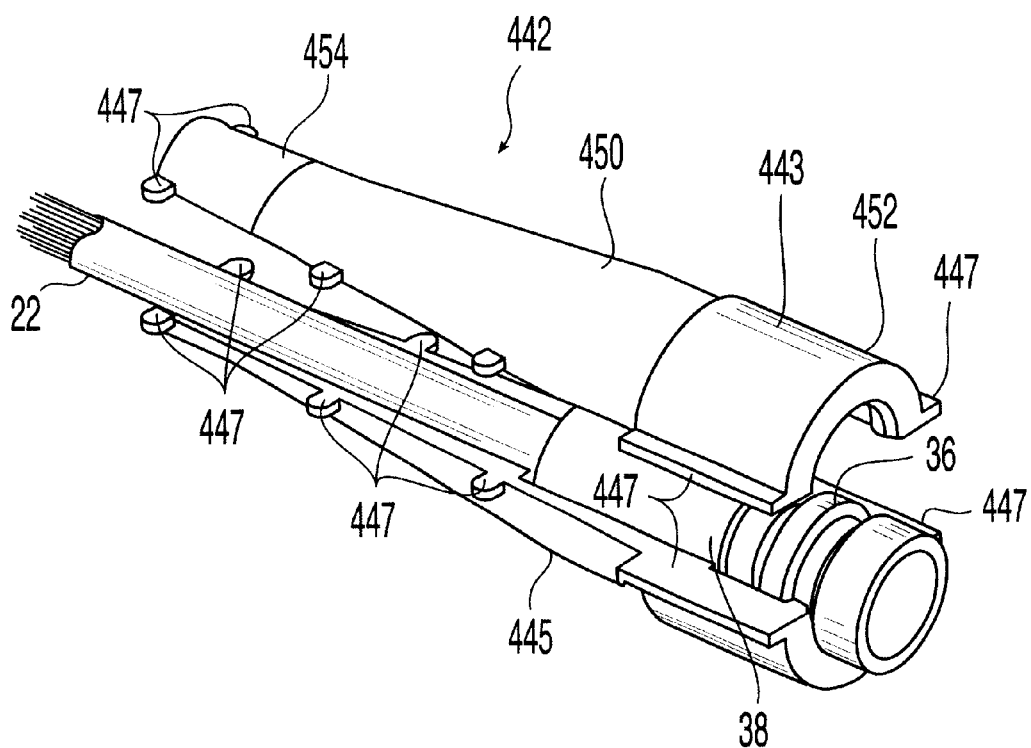
FIG. 6a is a perspective view of an embodiment of a two-part strain relief boot prior to attachment to a fiber optic cable and connector according to another embodiment of this invention.
Figure 6B:
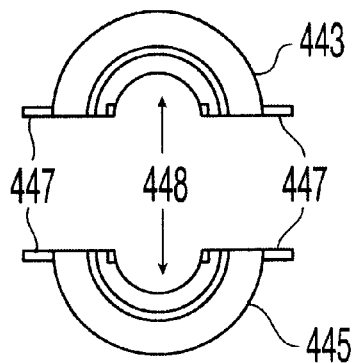

As an alternative to overmolding, other structures may be used for the extending member so as to be able to attach it to a connector and cable after the connector and cable are secured together. For example, the extending member may include two parts attached together to form the passageway for receiving the cable and connector. As shown in FIGS. 6a and 6b, extending member 442 includes a first part 443 and a second part 445. Flanges 447 may be provided along parts 443 and 445 to provide additional surface area for securing the two parts together, for example, by securing with an adhesive, hot melt, an ultrasonic weld, etc. Extending member 442 may have shapes other than that shown (including non-cylindrical shapes with uniformly extending members).

Figure 7A:
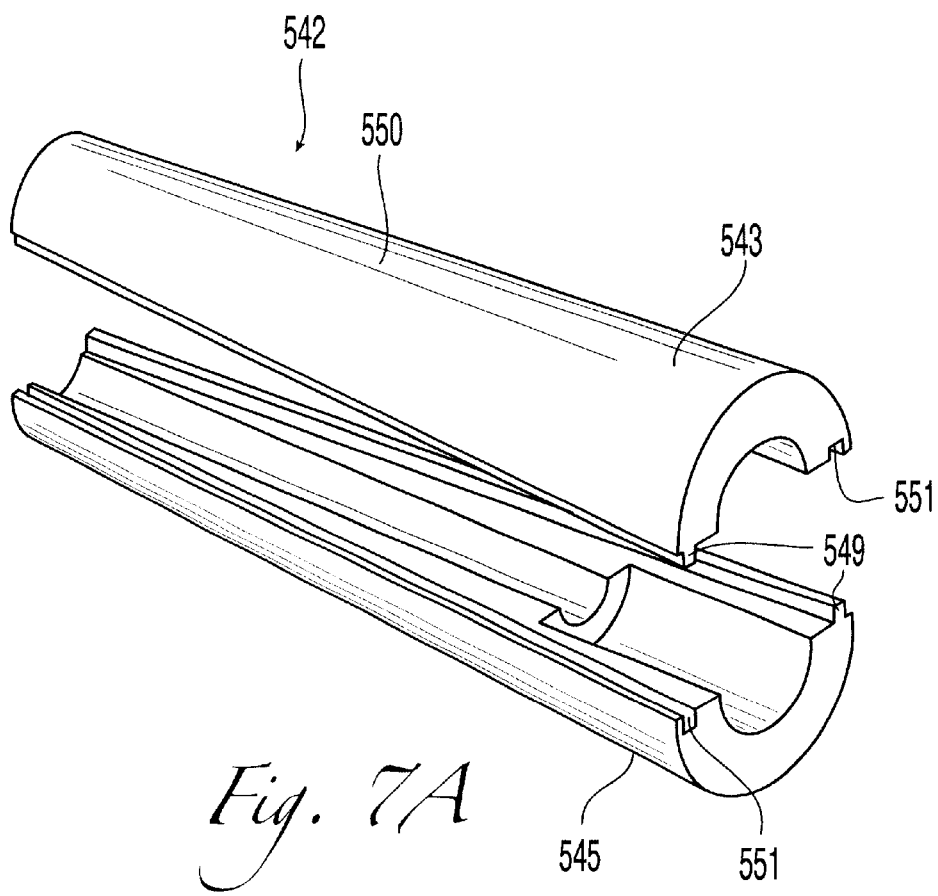
FIG. 7a is a perspective view of another embodiment of a two-part strain relief boot prior to attachment to a fiber optic cable and connector according to this invention.
Figure 7B:
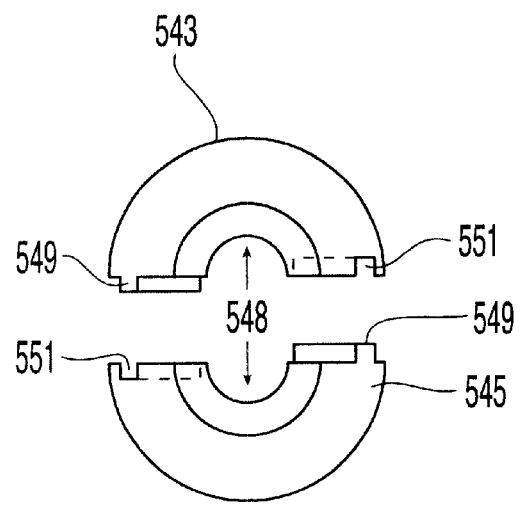

As shown in FIGS. 7a and 7b, an alternative design for an extending member 542 is provided. In this embodiment, a first part 543 and a second part 545 include mating elements to attach together the two parts of extending member 542. The mating elements comprise ridges 549 and grooves 551 that align and attach the two parts of extending member 542 together. As shown, ridges 549 and grooves 551 are substantially rectangular in cross section, although many alternative shapes may be utilized if desired. The mating elements may secure the two parts together by way of an interference fit or a snap fit, or elements such as adhesives, hot melts, or an ultra sonic weld may also be used to further secure the parts together. It is notable that extending member 542 tapers continuously from first end 544 to second end 546.

Figure 8A:
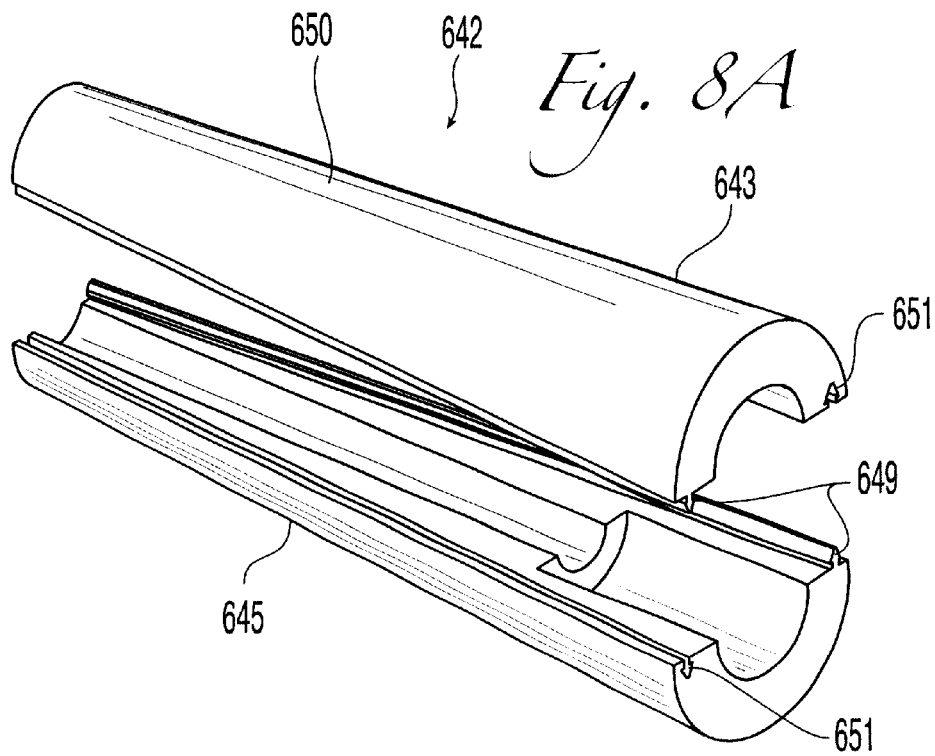
FIG. 8a is a perspective view of another embodiment of a two-part strain relief boot prior to attachment to a fiber optic connector according to this invention.
Figure 8B:
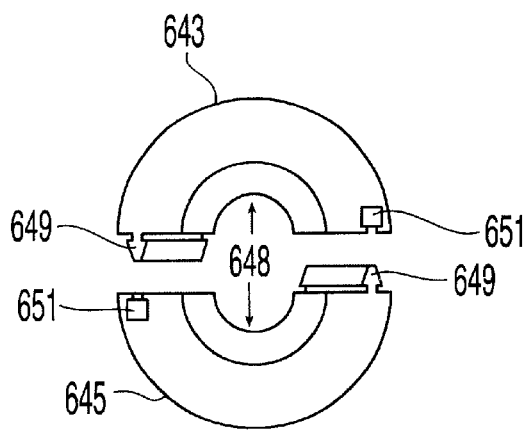
Figure 8C:
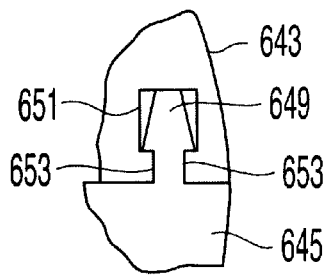
FIG. 8c is an enlarged partial view of the embodiment of FIG. 8a in a connected condition.

Another alternate embodiment is shown in FIGS. 8a–8c. In this embodiment, two mating parts 643 and 645 are provided to form extending member 642. In this embodiment, the ridges are replaced by projections 649 having an under-cut cross sectional shape for mating with edges 653 of grooves 651. Thus, a more secure fit may be achieved than that of FIGS. 7a and 7b, thereby potentially not requiring any additional attaching and securing means (e.g., use of adhesive, holt melt, ultrasonic weld, etc.).

Figure 9A:
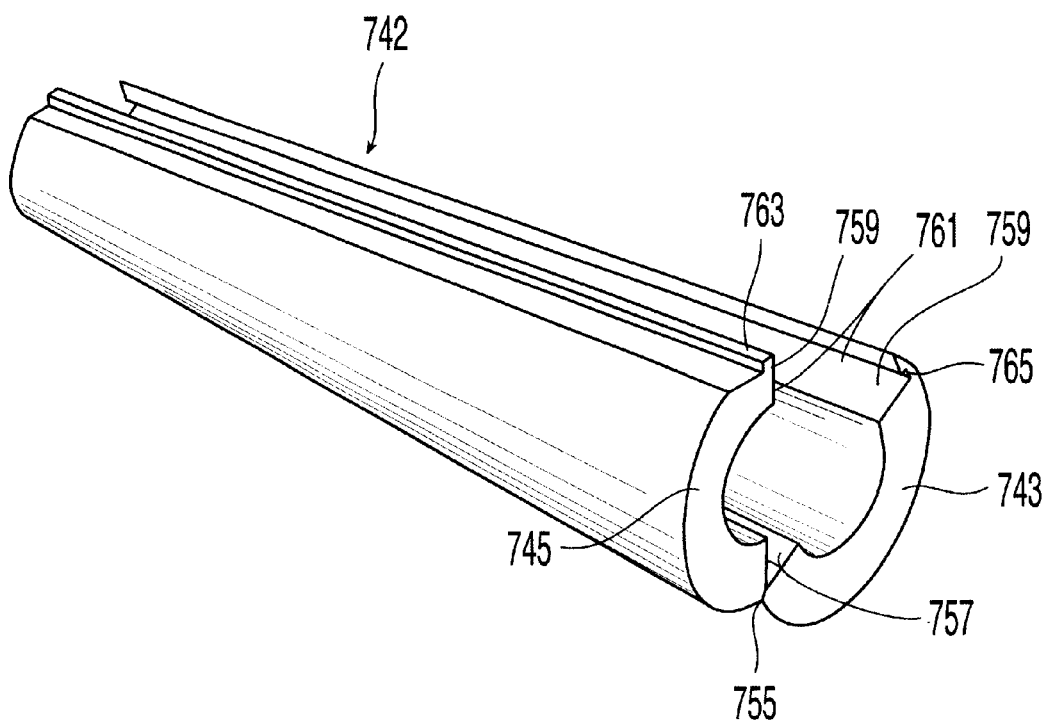
FIG. 9a is a perspective view of another embodiment of this invention in which two parts of the strain relief boot are connected by a living hinge.
Figure 9B:
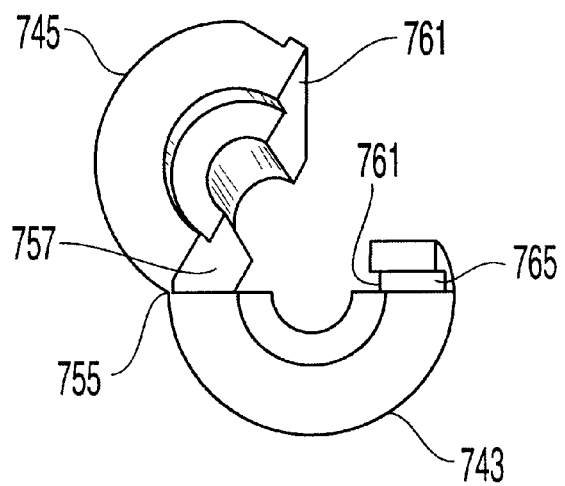

Another embodiment of an extending member is shown in FIGS. 9a and 9b. In these figures, extending member 742 includes two parts 743 and 745 that are unitarily formed. As shown, parts 743 and 745 may be connected by a living hinge 755 formed by a partial slit 757 formed in extending member 742. A full slit 759 is provided also to allow parts 743 and 745 to be separated. In alternative embodiments, partial slit 757 may be made smaller and/or may be eliminated.

Edges 761 of slit 759 thus may be joined to secure together extending member 742. If desired, a ridge 763 may be provided on one of the edges 761 to fit into a mating groove 765. Ridge 763 extends radially outward, unlike ridges 649 and 549 which extend substantially circumferentially or tangentially, relative to the center of the respective extending members. Again, adhesives, hot melts, ultrasonic welds, or other such means may be used to further secure edges 761 together.

For all of the previous two-part embodiments, if no adhesive or other permanent securing means is used, the parts may be readily separated without destruction if removal or replacement of the extending members is desired. Further, the embodiments comprising two molded halves may be molded from the same material as described above for the overmolded embodiments.

Another embodiment of an extending member is shown in FIGS. 10a and 10b. Extending member 842 includes a coil 867 attached to a connecting portion or collar 869 (shown schematically). Collar 869 may include a threadable interior surface (not shown) that is capable of engaging and connecting to coil 867. Coil 867 is flexible and can be threaded around cable 22 and connector 24. Connecting portion 869 includes an inner portion 871 including a slit 873 and an outer portion 875. Inner portion 871 is moveable relative to outer portion 875 to expose slit 873 to allow cable 22 to pass therethrough. Further outer portion 875 may be configured as a locking mechanism that securely attaches inner portion 871. The outer portion 875 and inner portion 871 can then be moved back to cover the slit.

A modified version of the device of FIGS. 10a and 10b is shown in FIGS. 11a and 11b. In this embodiment, inner portion 971 of collar 969 moves back and forth within channels 977 located in outer portion 975 to open or close slit 973. Otherwise, extending member 942 is similar to extending member 842.

It should be understood that various features of the embodiments set forth above can be combined with each other in order to create new embodiments. Thus particular elements or particular shapes of elements may be mixed and matched within the scope of this invention to achieve various different shapes of extending members suitable for use as a strain relief boot. All of the embodiments disclosed above are attachable to a fiber optic assembly, such as, for example a connector and cable subassembly after the cable has been permanently attached to the connector (other fiber optic assemblies include a connector with a fiber optic ribbon subassembly and a connector with an optical device assembly). Thus, the assembly of a connectorized fiber optic cable is simplified. Also, a strain relief boot may be replaced in the field to alter the characteristics of the boot, or if the original boot has become damaged.

In accordance with another aspect of the invention, a method of assembling a connectorized end of a fiber optic assembly with the strain relief boot is provided. The method includes the steps of: (1) preparing the end of a fiber optic assembly for connectorizing, connectorizing the fiber optic assembly by attaching a connector to the end of the fiber optic cable, ribbon, or optical device; and (2) attaching a flexible strain relief boot to the connector and a portion of the fiber optic cable, ribbon, or optical device after the connectorizing step.

The attaching step may include overmolding the strain relief boot, or may include sliding at least the fiber optic cable, ribbon, or optical device through an opening in the strain relief boot and into a passageway in the strain relief boot. This sliding step may include sliding the cable, ribbon, or optical device through an opening in a substantially radial direction, or threading the cable into a coil.

The attaching step may alternatively include attaching the two molded halves of the strain relief boot to enclose at least a portion of the fiber optic cable, ribbon, or optical device within a passageway extending through the strain relief boot. Further, the attaching step may include securing (either temporarily or permanently securing) the two molded halves using an interference fit, a snap fit, an adhesive, a hot melt, an ultrasonic weld, mating elements disposed on the two halves, or similar securing means. The two halves may be formed unitarily, and may include a hinge, and the two halves may be attached by pivoting the two halves at the hinge so as to provide contact between the two parts. The attaching step may also include threading a coil around at least the fiber optic cable, ribbon, or optical device. Further, the attaching step may include opening a collar attached to the coil and threading the fiber optic cable through the open collar, as well as closing the collar after the fiber optic cable has been threaded through the collar. The attaching step may also include the substeps of placing the strain relief boot around the fiber optic cable spaced from the connector, and sliding the strain relief boot along the fiber optic cable into engagement of the connector. Alternatively, the attaching step may include placing the strain relief boot simultaneously around a portion of the connector and the fiber optic cable, ribbon, or optical device.

It will be apparent skilled in the art that various modifications and variations can be made at this invention without departing from the scope and spirit of the invention. For example, specific shapes of various elements of the illustrated embodiments may be altered to suit particular connector or receptacle applications. Further, the extending member may be formed of a flexible material so as to bendably deflect along a portion of the fiber optic cable, or it may be formed of a rigid material so as to not deflect. Alternatively, the extending member may be a combination of flexible and non-flexible material. Also, specific method steps may be similarly altered. It is intended that this invention include such modifications and variations as come within the scope of the appended claims and their equivalents.

What is claimed is:

1. A strain relief boot comprising:
an extending member having a first end configured for attachment to a connector, a second end opposite the first end, and a passageway extending from the first end to the second end configured to receive a portion of a fiber optic cable and a portion of the connector, the extending member being flexible so as to be bendably deflectable along with the portion of the fiber optic cable, the extending member configured to be disposed on the connector and the portion of the fiber optic cable after the connector is mated with the fiber optic cable.

2. The strain relief boot of claim 1, wherein the extending member is configured as an overmolded component.

3. The strain relief boot of claim 1, wherein the extending member includes a slit extending from the first end to the second end in communication with the passageway, the slit configured for passing at least the fiber optic cable into the passageway in a radial direction.

4. The strain relief boot of claim 1, wherein the extending member includes two parts configured to be attached together to form the passageway therebetween.

5. The strain relief boot of claim 4, wherein the extending member includes at least one hinge formed unitarily with and between the two parts.

6. The strain relief boot of claim 4, wherein the two parts are formed nonunitarily.

7. The strain relief boot of claim 4, wherein the two parts are secured together at least partially by an adhesive.

8. The strain relief boot of claim 4, wherein the two parts are secured together at least partially by a hot melt.

9. The strain relief boot of claim 4, wherein the two parts are secured together at least partially by an ultrasonic weld.

10. The strain relief boot of claim 4, wherein the two parts are attached together at least partially by mating elements disposed on each of the two parts.

11. The strain relief boot of claim 4, wherein the two parts are attached together at least partially by an interference fit.

12. The strain relief boot of claim 4, wherein the two parts are attached together at least partially by a snap fit.

13. The strain relief boot of claim 1, wherein the extending member includes a coil element.

14. The strain relief boot of claim 13, wherein the coil element has two ends and the extending member includes a collar disposed at one of the two ends.

15. The strain relief boot of claim 14, wherein the collar includes a first part and a second part, the second part being movable relative to the first part to open or to close a slit extending axially along the collar.

16. The strain relief boot of claim 15, wherein the collar is configured to be attachable to or removable from the fiber optic cable and the connector when the slit is opened, and wherein the collar is further configured to secure the extending member to the fiber optic cable and the connector when the slit is closed.

17. The strain relief boot of claim 1, wherein the extending member is at least partially curved along its length.

18. The strain relief boot of claim 17, wherein the extending member is configured so that a curvature of the extending member has a radius of curvature greater than a minimum bend radius of the fiber optic cable.

19. The strain relief boot of claim 17, wherein the extending member is curved from about 179 degrees to about 90 degrees.

20. The strain relief boot of claim 1, wherein the extending member is substantially straight along its length.

21. The strain relief boot of claim 1, wherein the extending member includes a tapered portion having an outer diameter that decreases in the direction of the second end of the extending member.

22. The strain relief boot of claim 21, wherein the extending member tapered portion tapers uniformly.

23. The strain relief boot of claim 21, wherein the extending member tapers nonuniformly.

24. The strain relief boot of claim 1, wherein the extending member defines openings extending substantially radially.

25. The strain relief boot of claim 1, wherein the extending member is configured to be rotatable relative to the connector.

26. A strain relief boot comprising:
an extending member having a first end configured for attachment to a connector, a second end opposite the first end, and a passageway extending from the first end to the second end configured to receive a portion of a fiber optic cable and a portion of the connector, the extending member being rigid, the extending member configured to be positioned simultaneously around the portion of the connector and the portion of the fiber optic cable after the connector is mated with the fiber optic cable.

27. A strain relief boot comprising:
an extending member having a first end configured for attachment to a connector, a second end opposite the first end, and a passageway extending from the first end to the second end configured to receive a portion of a fiber optic ribbon and a portion of the connector, the extending member being flexible so as to be bendably deflectable along with the portion of the fiber optic ribbon relative to the connector, the extending member configured to be disposed on the connector and the portion of the fiber optic ribbon after the connector is mated with the fiber optic ribbon.

28. A strain relief boot comprising:
an extending member having a first end configured for attachment to a connector, a second end opposite the first end, and a passageway extending from the first end to the second end configured to receive a matable portion of an optical device and a portion of the connector, the extending member being flexible so as to be bendably deflectable along with the portion of the optical device relative to the connector, the extending member configured to be attachable to the connector and the portion of the optical device after the connector is mated with the optical device.

29. A strain relief boot for a connectorized end of a fiber optic cable assembly having a connector secured to a fiber optic cable, the strain relief boot comprising:
an extending member having a first end configured for attachment to the connector, a second end opposite the first end, and a passageway extending from the first end to the second end configured to receive a portion of the fiber optic cable and a portion of the connector, the extending member being flexible so as to be bendably deflectable along with the portion of the fiber optic cable relative to the connector; and attachment means for attaching the extending member to the connector and the portion of the fiber optic cable after the connector and the fiber optic cable are secured together.

30. A connectorized fiber optic cable assembly comprising:

a fiber optic cable having at least one end;

a connector attached to the end to thereby connectorize the fiber optic cable end; and a strain relief boot including an extending member having a first end configured for attachment to the connector, a second end opposite the first end, and a passageway extending from the first end to the second end configured to receive a portion of the fiber optic cable and a portion of the connector, the extending member being flexible so as to be bendably deflectable along with the portion of the fiber optic cable relative to the connector, the extending member configured to be disposed on the connector and the portion of the fiber optic cable after the connector and the fiber optic cable are secured together.

31. A method of assembling a connectorized end of a fiber optic cable, the method comprising the steps of:

preparing the end of a fiber optic cable for connectorizing;

connectorizing the fiber optic cable by mating a connector with the end of the fiber optic cable; and attaching a flexible strain relief boot to the connector and a portion of the fiber optic cable after the connectorizing step.

32. The method of claim 31, wherein the attaching step includes threading a coil around at least the fiber optic cable.

33. The method of claim 32, wherein the attaching step includes opening a collar attached to the coil and threading the at least the fiber optic cable through the opened collar.

34. The method of claim 33, wherein the attaching step includes closing the collar after the at least the fiber optic cable has been threaded through the collar.

35. The method of claim 31, wherein the attaching step includes the substeps of:

placing the strain relief boot around the fiber optic cable spaced from the connector; and sliding the strain relief boot along the fiber optic cable into engagement with the connector.

36. The method of claim 31, wherein the attaching step includes placing the strain relief boot simultaneously around the connector and the fiber optic cable.

37. The method of claim 31, wherein the attaching step includes overmolding the strain relief boot.

38. The method of claim 31, wherein the attaching step includes sliding at least the fiber optic cable through an opening in the strain relief boot into a passageway extending through the strain relief boot.

39. The method of claim 31, wherein the attaching step includes attaching two parts of the strain relief boot together to enclose at least a portion of the fiber optic cable within a passageway extending through the strain relief boot.

40. The method of claim 39, wherein the attaching two parts step includes at least partially attaching together the two parts of the strain relief boot with an interference fit.

41. The method of claim 39, wherein the attaching two parts step includes at least partially attaching together the two parts of the strain relief boot with a snap fit.

42. The method of claim 39, wherein the attaching two parts step includes at least partially attaching together the two parts of the strain relief boot with an adhesive.

43. The method of claim 39, wherein the attaching two parts step includes at least partially attaching together the two parts of the strain relief boot with a hot melt.

44. The method of claim 39, wherein the attaching two parts step includes at least partially attaching together the two parts of the strain relief boot with an ultrasonic weld.

45. The method of claim 39, wherein the attaching two parts step includes at least partially attaching together the two parts of the strain relief boot with at least two mating elements disposed on the two parts.

46. The method of claim 39, wherein the two parts are formed unitarily with a hinge, and wherein the attaching two parts step includes pivoting the two parts via the hinge so as to provide contact between the two parts.

* * * * *

UNITED STATES PATENT AND TRADEMARK OFFICE
CERTIFICATE OF CORRECTION

PATENT NO. : 6,672,774 B2
DATED : January 6, 2004
INVENTOR(S) : Thomas Theuerkorn and Stephen Toepper It is certified that error appears in the above-identified patent and that said Letters Patent is hereby corrected as shown below:

Column 9,
Line 20, delete "disposed on" and substitute -- postioned simultaneously around the portion of --.

Column 10,
Line 44, delete "disposed on" and substitute -- postioned simultaneously around the portion of --.

Column 11,
Line 3, delete "attaching" and substitute -- postioning --.
Line 3, delete "to" and substitute "simultaneously around the portion of --.
Line 5, add -- and for attaching the extending member to the portion of the connector and the portion of the fiber optic cable -- before "after".
Line 21, delete "disposed on" and substitute -- positioned simultaneously around the portion of --.
Line 30, delete "flexible".
Line 30, delete "to" and substitute "simultaneously around the portion of --.

Column 12,
Delete lines 5-7 (claim 36).

Signed and Sealed this

Sixth Day of April, 2004

JON W. DUDAS
*Acting Director of the United States Patent and Trademark Office*